Nov. 10, 1925.　　　　　　　　　　　　　　　　1,560,980
W. S. DE CAMP
AUTOMATIC SLACK ADJUSTER FOR AIR BRAKES
Filed April 10, 1925　　　2 Sheets-Sheet 1
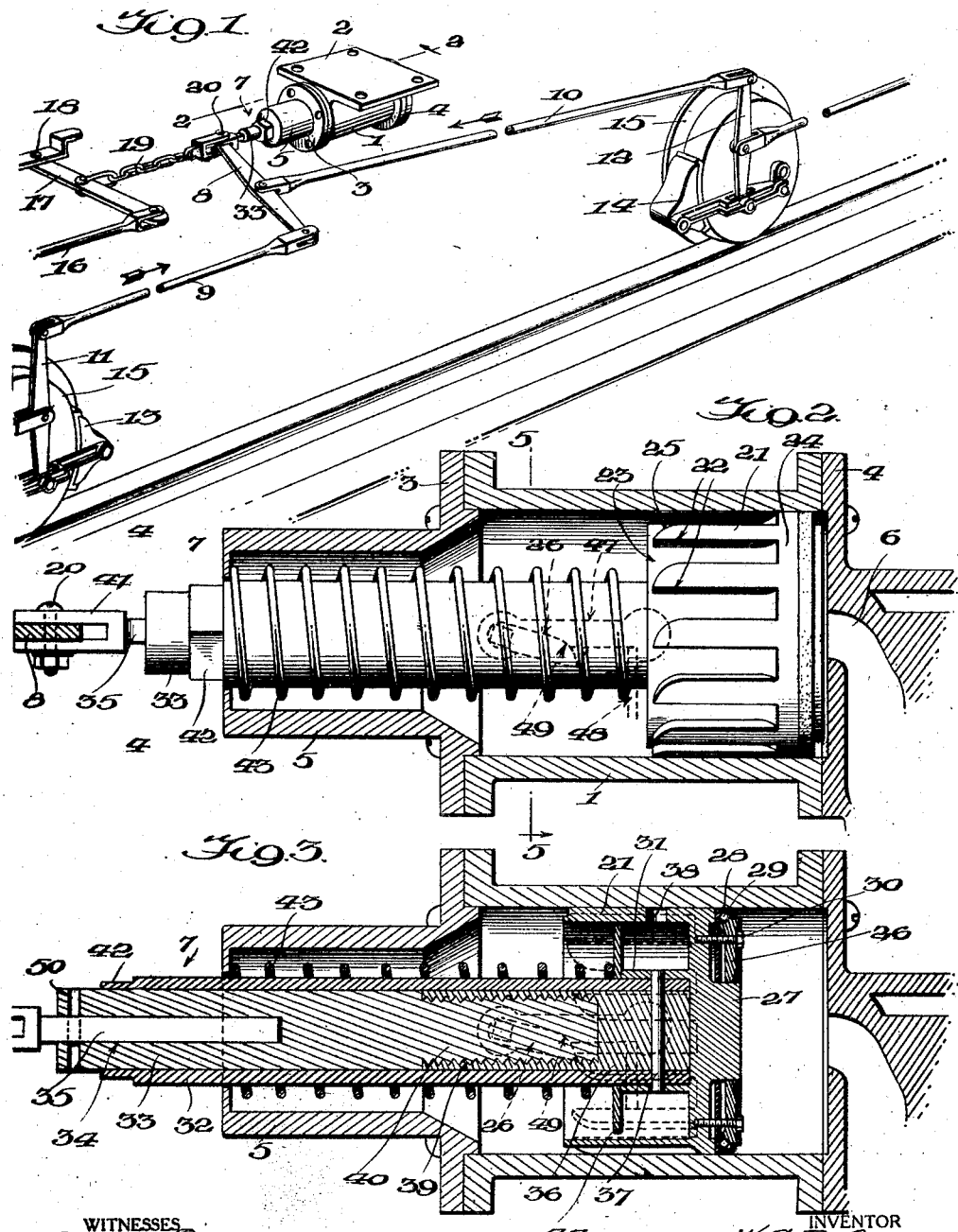
WITNESSES
INVENTOR
W. S. De Camp,
BY
ATTORNEYS

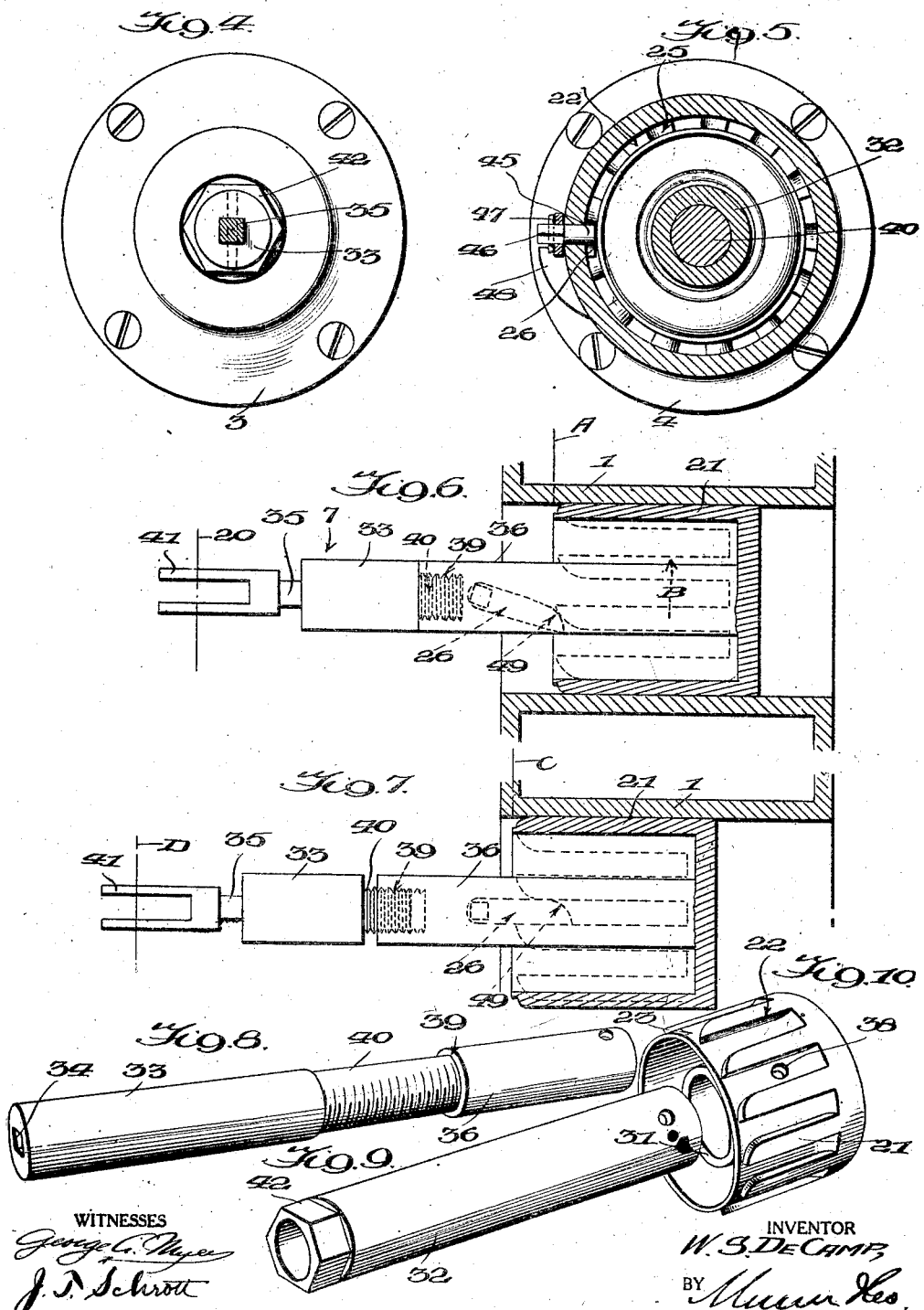

Patented Nov. 10, 1925.

1,560,980

UNITED STATES PATENT OFFICE.

WILLIAM S. DE CAMP, OF CHILLICOTHE, OHIO.

AUTOMATIC SLACK ADJUSTER FOR AIR BRAKES.

Application filed April 10, 1925. Serial No. 22,203.

*To all whom it may concern:*

Be it known that I, WILLIAM S. DE CAMP, a citizen of the United States, and a resident of Chillicothe, in the county of Ross and State of Ohio, have invented certain new and useful Improvements in Automatic Slack Adjusters for Air Brakes, of which the following is a specification.

This invention relates to improvements in slack adjusters for air brakes and it consists of the constructions, combinations and arrangements herein described and claimed.

An object of the invention is to provide a device for periodically adjusting the brake shoes in respect to the thickness of the wheels as required, said device being incorporated in the piston and plunger in the brake cylinder, the operation occurring automatically when air under pressure is admitted to the cylinder.

Other objects and advantages appear in the following specification, reference being had to the accompanying drawings, in which Figure 1 is a diagrammatic perspective view of enough of an air brake system for reference in connection with the slack adjuster.

Figure 2 is a longitudinal section of the brake cylinder, taken substantially on the line 2—2 of Figure 1, showing the piston in the brake shoe release position.

Figure 3 is a similar sectional view showing the piston in the brake shoe application position.

Figure 4 is a cross section taken on the line 4—4 of Figure 2.

Figure 5 is a cross section taken on the line 5—5 of Figure 2.

Figure 6 is a sectional diagram illustrating the approximate action of the piston when the brake shoe is comparatively new, Figure 7 is a sectional diagram illustrating the action when the brake shoe has begun to wear, Figure 8 is a detail perspective view of the automatically extensible core.

Figure 9 is a detail perspective view of the plunger sleeve.

Figure 10 is a detail perspective view of the improved piston.

As already stated in the foregoing general object of the invention, its purpose is to provide a device for so adjusting the slack in an air brake system that the brake shoes will be moved up to the faces of the various wheels as wear occurs thereby keeping the brake system in proper condition. The improved slack adjuster is applicable to any of the existing types of air brake systems whether they be used in connection with railway locomotives, freight or passenger cars, street cars, etc.

A prerequisite to the power and efficiency of an air brake is a proper piston travel, and the average piston travel having been determined it is desirable to maintain it as closely as possible to the average. Consideration for a moment will make it evident to the reader that a brake cylinder piston must travel farther to apply the brake when the shoes are badly worn than it must travel when the shoes are comparatively new. To keep the brake shoes in proper adjustment would require practically constant inspection and in order to avoid this impossibility automatically operating slack adjusters have been devised. The improved slack adjuster has been incorporated in the piston and plunger of the brake cylinder, thereby distinguishing from existing slack adjusters which consist of mechanism located on the outside.

Reference is first made to Figure 1. The brake cylinder 1 has a flange arrangement 2 by means of which it can be secured beneath a vehicle having air brakes, whether that vehicle be a locomotive, freight, passenger or other car.

Heads 3 and 4 close the ends of the cylinder 1 the first head including a tubular extension 5, the second head carrying a triple valve mechanism (not shown) which includes a passage 6 (Fig. 2) and which air under compression is admitted from such reservoir as may be provided.

A plunger, generally designated 7 operates in the cylinder 1 and tubular extension 5, and when thus operated causes rocking of the cylinder lever 8 (Fig. 1) so that power is applied to the pull rods 9 and 10 in the direction of the arrows, all this being according to established practice. The extremities of the pull rods have connection with brake levers 11 and 12 which in turn act upon the brake shoes 13 and 14 moving them against the faces of wheels 15 in order to perform the braking action. The foregoing structure is found on passenger and freight cars but not on locomotives.

Hand operation of the brakes is permissible by means of hand brake rods 16 which have connection with the hand brake lever 17 at one extremity, the opposite extremity being fulcrumed at 18 to a fixed bracket. A chain or other flexible connection 19 joins the hand brake lever to an appropriate part of the cylinder lever so that operation of the hand brake mechanism will cause movement of the cylinder lever as before. The connection is made at a common pivot 20 mentioned again farther down.

The invention comprises the piston 21 (Figs. 2 and 3) which moves to the left in the brake cylinder 1 when compressed air is admitted at the passage 6. In thus moving it projects the plunger 7 to rock the cylinder lever 8. The surface of the piston is interrupted by a plurality of parallel and longitudinal grooves 22 which give the surface a fluted appearance and provide an alternate arrangement of grooves and ribs. The grooves open at the skirt extremity of the piston, as at 23, but fall short and are closed at the head extremity as at 24. One corner of each rib, resulting from the formation of the grooves, is rounded at 25 for the purpose of coacting with a pawl 26 and causing a partial rotation of the piston 21 in the counter-clockwise direction when a certain amount of wear of the brake shoes 13 and 14 has occurred.

A circular follower head 26 (Fig. 3) fits upon a central boss 27 on the piston and aids in holding the customary cup packing 28 in place upon the piston head. An expansible resilient ring 29 is interposed between the inner edge of the follower head and the base of the cup washer. A number of suitable screws 30 secure the follower head upon the piston. Upon the return stroke of the piston the expanding ring and cup leather packing assist in holding the piston in the position to which it has been turned. The return stroke of the piston is limited by engagement with the cylinder head 4.

An internal collar 31 which is integral with the piston head (Fig. 3) fixedly carries a sleeve 32 and core 33. The core has a non-circular bore 34 in which the corresponding non-circular rod 35 fits. The sleeve 32, core 33 and rod 35 all comprise the plunger previously designated 7 in general. These parts move as one when air is admitted against the head of the piston 21.

The core 33 includes a section 36 which is secured to the sleeve 32 by a pin 37 admitted at an opening 38 in the piston 21.

The sleeve 32 is part of existing equipment in an air brake cylinder. The core 33 fits inside of the sleeve thereby avoiding redesigning the existing equipment. As stated, the piston 21, sleeve 32 and core section 36 are rigidly connected by the pin 37 but these parts are rotatable in the counter-clockwise direction upon appropriate engagement of the rounded approaches 25 with the pawl 26.

A threaded bore 39 in the section 36 receives the threaded stem 40 of the core 33, and when the foregoing turning of the piston occurs a separation of the core 33 from the section 36 in the axial direction results, advancing the common pivot 20 in respect to the plunger 7. This advancement of the common pivot will pull up on the rods 9 and 10 (Fig. 1) thereby gradually adjusting the brake shoes 13 and 14 to compensate for wear. The bifurcated head 41 at which the common pivot 20 makes connection of the lever 8 with the rod 35 keeps the rod from turning, and also keeps the core 33 from turning by virtue of the engagement of the non-circular rod with the non-circular bore 34. The core 33 is therefore capable of reciprocable motion, but cannot turn.

A hexagonal or other non-circular end 42 of the sleeve 32 permits turning of the sleeve and its connected parts, including the section 36, so that the section can be screwed back upon the threaded stem 40 to assume the original adjustment when the old and worn brake shoes are replaced by new ones. A wrench is applied to the head 42 for the purpose.

It is necessary to turn the parts back so that the automatic adjustment of slack may again begin from the starting point.

A spring 43 returns the piston upon release of the compressed air in the piston head at the right end. This spring bears against the closed end of the tubular extension 5 and against a washer 44 (Fig. 3) which rests against the collar 31. The washer 44 provides a swivel mounting for the spring, and performs its most important function when the engagement of a rounded approach 25 with the pawl 26 produces a turn of the cylinder 21. The spring 43 is under tension particularly so when the piston is forced to the left and the aforesaid turning is occurring. If this tension were expended against the piston directly the torsion effect upon the spring would simply counter rotate the piston 21 upon its return movement to the right thereby nullifying the function of the approach 25 and pawl 26. The interposition of the washer 44 permits relative turning of the piston 21 without causing any clinching effort or torsion effect upon the spring 43.

The pawl 26 is journaled in the side of the brake cylinder 1 (Fig. 5). It includes a stub shaft 45 with a non-circular end 46 upon which a lever 47 is fitted. The lever represents a weight which normally holds the pawl 26 down in the position shown in Figures 2, 3 and 6. The downward movement of the pawl is limited by the engagement of the lever with a stop 48 on the side of the cylinder.

The operation is readily understood from the foregoing description. Assume first that each of the brake shoes 13 and 14 (Fig. 1) is practically new. The core 33 and rotatable base section 36 will be screwed together as in Figures 3 and 6. A stroke of the piston 21 in the cylinder 1 under the influence of compressed air admitted to the right end at the passage 6, will extend approximately to the broken line A (Fig. 6). The nearest rounded approach 25 will barely touch the pawl 26, the upper end of which is correspondingly rounded at 49. The action on the pull rods 9 and 10 (Fig. 1) resulting from the movement of the piston 21 applies the brake shoes.

As wear occurs on the faces of the brake shoes 13 and 14 the piston 21 must travel farther upon each brake application stroke in order to obtain the original result. These slightly increased strokes of the piston 21 will find the leading edge of the piston skirt advancing beyond the line A (Fig. 6) so that the rounded approach 25 moves farther toward the rounded end 49 of the pawl. The pawl is fixed so far as downward movement is concerned, and the foregoing advancement of the piston will result in a slight turning of the piston over toward the observer (Fig. 6) in the direction of the arrow B, this being the counter-clockwise direction when looking at the head of the piston.

This turning of the piston unscrews the core 33 from the base section 36. The common pivotal point 20 becomes advanced gradually in respect to the plunger 7. This gradual advancement has the effect of holding the brake shoes 13 and 14 closer to the face of the wheels 15 each time. The advancement of the piston 21 beyond the line A (Fig. 6) continues until a stroke extends to the broken line C (Fig. 7). The position here shown represents the limit of turning of the piston 21 by the effort of one rib against the pawl 26.

The piston 21 moves back to the right end of the cylinder 1 when the air pressure is released and as soon as the pawl 26 is released from the position to Figure 7 it gravitates back to the inclined position in Figure 6. The rounded approach 25 of the next rib will ride up on the rounded end 49 of the pawl and cause a turn of the piston 21 equal to all of the fractional turns imparted to the piston in leading up to the position at the line C. The next application stroke of the piston may cause a similar turn of the piston, each causing more unscrewing of the core 33. The common pivotal point 20 may ultimately reach the position D (Fig. 7) at which the wear of the brake shoes may be compensated for, and subsequent turning of the piston 21 by virtue of the approaches 25 riding upon the pawl 26 will then have the effect of adjusting the piston 21 farther back in the cylinder so that its application strokes will ultimately again end at the line A (Fig. 6).

In the event that the slack adjuster is used upon a locomotive, the plunger 7 is connected directly to the appropriate lever of the locomotive brake system. For this purpose the core 33 has a hole 50 (Fig. 3) at which the necessary connection is made. The non-circular rod 35 is then omitted. Inasmuch as the operation in the case of the locomotive is identical with that described it is regarded unnecessary to provide a specific illustration of the application of the core 33 to the locomotive brake lever.

I claim:—

1. An air brake system comprising a cylinder, brake shoes, articulated connections, a plunger, a common pivot joining the plunger to said articulated connections; in combination, a piston in the cylinder carrying the plunger, and means operatively associated with the cylinder and piston for progressively advancing said common pivot in respect to the plunger upon application stroke of the piston to compensate for wear of the brake shoes.

2. An air brake system comprising a cylinder, brake shoes, articulated connections, a plunger and a common pivot joining said plunger to the articulated connections; in combination, a piston carrying the plunger and being operable in the cylinder, a sectional core constituting part of the plunger, and means associated with the cylinder and piston causing a separation of the core sections and a progressive advancement of the common pivots in respect to the plunger upon application strokes of the piston, thereby to compensate for wear of the brake shoes through adjustments of the articulated connections.

3. An air brake system comprising a cylinder, a plunger, articulated connections, brake shoes operated thereby; in combination, a piston operable in the cylinder and carrying the plunger, an adjustable core to which an element of said connections is practically directly pivotally joined, means forming part of the plunger having engagement with the adjustable core, and means associated with the cylinder and piston for so operating said plunger carried means upon each application stroke of the piston to produce relative movement of the core to thereby advance said pivotal joint and through said articulated connections cause readjustment of the brake shoes to compensate for wear.

4. A slack adjuster for air brake systems comprising a brake cylinder, a piston operable in said cylinder, a plunger carried by the piston including a sectional core, means by which connection of one of the sections is made with a number of articulated brake connections, means upon the piston for turning the piston upon an application stroke, means carried by the cylinder engageable by said means on the piston thereby producing said turning, and means utilizing said turning of the piston to produce relative movement of said core sections to thereby fit said common pivot.

5. A slack adjuster for air brake systems comprising a brake cylinder, a piston operable therein, a sleeve, a core including a base section situated in the sleeve, means connecting said piston, sleeve and base sections together to reciprocate as one, means on the piston causing turning upon movement of the piston on an application stroke, means carried by the cylinder which is engaged by said piston-carried means to thereby produce said turning, means including a common pivot through which the core is joined with brake connections, and a threaded arrangement between the core and base sections causing relative axial motion of the core and pivot in respect to the sleeve upon turning of the piston.

6. A slack adjuster for air brake systems comprising a brake cylinder, a piston operable in the cylinder, a plunger carried by the piston including a sectional core, one section of which is fixed to the piston, means by which pivotal connection is made with the remaining core section and a cylinder lever, means associated with the air brake cylinder piston for producing periodical turning of the piston, a threaded connection between the core sections causing relative extension of the pivotal connection in respect to said fixed section, means including a spring for returning the piston after an application stroke, and means including a washer providing a swivel mounting for that end of the spring then against the piston preventing counter rotational movement of the piston upon the return stroke of the piston.

7. A slack adjuster for air brake systems comprising a brake cylinder, a piston operable in the cylinder and having an internal collar, a plunger consisting of a sleeve and a core including a base section, means including a pin for securing the collar, sleeve and base sections together to move as one, a plurality of grooves formed on the surface of the piston providing ribs, certain ends of said ribs having rounded approaches, a pawl carried by the cylinder with which the rounded approach of the ribs is engageable upon an application stroke of the piston causing turning of the piston, means by which pivotal connection is made between said core and the cylinder lever of a brake system, and means including a threaded connection between said core and sections causing relative advancement of said core and pivots in respect to the plunger sleeve upon turning of the piston.

8. A slack adjuster for air brake systems comprising a brake cylinder, a piston operable in the cylinder and having an internal collar, a plunger consisting of a sleeve and a core including a base section, means including a pin for securing the collar, sleeve and base sections together to move as one, a plurality of grooves formed on the surface of the piston providing ribs, certain ends of said ribs having rounded approaches a pawl carried by the cylinder with which the rounded approach of the ribs is engageable upon an application stroke of the piston causing turning of the piston, means by which pivotal connection is made between said core and the cylinder lever of a brake system, means including a threaded connection between said core and sections causing relative advancement of said core and pivots in respect to the plunger sleeve upon turning of the piston, and means including a spring for producing a return stroke of the piston, and means constituting a swivel and including a washer abutting the collar against which the spring bears preventing counterrotation of the piston upon said return stroke.

9. A slack adjuster for air brake systems comprising a brake cylinder, a piston operable in the cylinder and having an internal collar, a plunger consisting of a sleeve and a core including a base section, means including a pin for securing the collar, sleeve and base sections together to move as one, a plurality of grooves formed on the surface of the piston providing ribs, certain ends of said ribs having rounded approaches, a pawl carried by the cylinder with which the rounded approach of the ribs is engageable upon an application stroke of the piston causing turning of the piston, means by which pivotal connection is made between said core and the cylinder lever of a brake system, means including a threaded connection between said core and sections causing relative advancement of said core and pivots in respect to the plunger sleeve upon turning of the piston, means including a stub shaft by which the pawl is swingably mounted in the cylinder wall permitting rising of the pawl into parallelism with one of said grooves and predetermined action of the piston, a lever carried by the stub shaft providing a counter-weight to return the pawl to the normal position, and means including a stop on the cylinder to limit the gravitation of said counter-weight and retain the pawl in said normal position.

WILLIAM S. DE CAMP.